United States Patent [19]
Grass et al.

[11] Patent Number: 5,941,510
[45] Date of Patent: Aug. 24, 1999

[54] METAL/ELASTOMERIC BUMPER FOR AIR SPRINGS

[75] Inventors: David E. Grass; Mark D. Hilburger; Daniel J. Leonard, all of Carmel; Mohamad Taghizadeh, Indianapolis, all of Ind.; Michael K. Whitaker, Jackson, Tenn.

[73] Assignee: Bridgestone/Firestone, Inc., Akron, Ohio

[21] Appl. No.: 09/109,226

[22] Filed: Jun. 30, 1998

[51] Int. Cl.⁶ .......................... F16M 11/00; F16M 9/00; B60G 15/00
[52] U.S. Cl. ........................................ 267/64.27; 280/711
[58] Field of Search .............................. 267/64.21, 64.23, 267/64.24, 64.27, 140; 280/711–714

[56] References Cited

U.S. PATENT DOCUMENTS

| | | | |
|---|---|---|---|
| 2,988,353 | 6/1961 | Dietrich | 267/65 |
| 3,658,314 | 4/1972 | Luzsicza | 267/121 |
| 4,218,599 | 8/1980 | Garn | 200/159 R |
| 4,325,541 | 4/1982 | Korosladanyi et al. | 267/64.21 |
| 4,342,264 | 8/1982 | Hindin et al. | 105/215 |
| 4,478,396 | 10/1984 | Kawaura | 267/8 R |
| 4,506,910 | 3/1985 | Bierens | 280/711 |
| 4,787,606 | 11/1988 | Geno et al. | 267/64.27 |
| 4,852,861 | 8/1989 | Harris | 267/64.27 |
| 4,946,144 | 8/1990 | Geno et al. | 267/64.27 |
| 5,060,916 | 10/1991 | Koschinat et al. | 267/64.27 |
| 5,201,500 | 4/1993 | Ecktman et al. | 267/140 |
| 5,382,006 | 1/1995 | Arnold | 267/64.27 |

*Primary Examiner*—Chris Schwartz
*Attorney, Agent, or Firm*—D.A. Thomas

[57] ABSTRACT

An air spring has a pair of spaced end members for mounting the spring at spaced locations on a structure. A flexible sleeve of elastomeric material is sealingly engaged with the end members and forms a pressurized fluid chamber therebetween. A post is mounted on one of the end members and extends into the fluid chamber. A shock absorbing two-piece bumper includes a rigid metal base which is formed as an inverted cup-shaped member with a cylindrical sidewall. The base is secured to one of the end members with the post extending into an open end of the base member. An elastomeric member is snap-fitted into a hole formed in an end closure wall of the base member and engages the opposite end member upon the air spring failing or experiencing a large deflection. In an alternate embodiment, a plurality of flexible fingers are formed from the cylindrical sidewall of the base and are snap-fit to the post to mount the base member on the post and on the one end member of the air spring.

18 Claims, 3 Drawing Sheets

5,941,510

METAL/ELASTOMERIC BUMPER FOR AIR SPRINGS

BACKGROUND OF THE INVENTION

1. Technical Field

The invention relates to air springs and in particular to air springs having an internal bumper which acts as a backup in case of air spring failure or to absorb sudden large deflections or shocks imparted on the air spring. More particularly, the invention relates to a two-piece air spring having a metal base and an elastomeric pad mounted thereon replacing the heretofore single piece elastomeric bumpers used for prior air spring bumpers.

2. Background Information

Pneumatic springs, commonly referred to as air springs, have been used for motor vehicles and various machines and other equipment for a number of years to provide cushioning between movable parts, primarily to absorb shock loads imparted thereon. The air spring usually consists of a flexible rubber sleeve which extends between a pair of end members and which contains a supply of compressed air. One of the end members usually is a piston located at the end of the flexible sleeve. The end members mount the air spring on spaced components or parts of the vehicle or equipment on which the air spring is mounted.

The internal pressurized fluid which is generally air, absorbs most of the shock impressed upon or experienced by one of the spaced end members on which the air spring is mounted, with the end members moving axially towards and away from each other upon absorbing the imparted shock. Examples of such air springs are shown in U.S. Pat. Nos. 4,852,861 and 4,946,144.

Certain of these prior art air springs have internal bumpers mounted on one of the end members which extends into the interior of the pressurized chamber. The bumper prevents total collapse or deflection of the spring member in the event of air spring failure or when not inflated, or to absorb shock upon the spring experiencing severe shocks and deflections. Heretofore, these bumpers consisted of a single elastomeric or rubber member which was mounted on a stud extending outwardly from one of the end members such as shown in U.S. Pat. Nos. 4,506,910 and 4,787,606. Although these single member elastomeric bumpers are satisfactory for most applications, it is desirable for certain applications that the bumper has a higher load carrying capacity with less deflection than that provided by the integral one-piece bumpers such as shown in the above referenced U.S. Patents.

Examples of other prior art showing shock absorbing components are set forth in the following patents.

U.S. Pat. No. 4,478,396 discloses an elastomeric bumper which is mounted on the top of a vehicle strut.

U.S. Pat. No. 3,658,314 discloses a fluid shock absorber having an elastomeric member mounted between two concentrically movable tubes with an elastomeric bumper mounted beneath the inner tube to absorb impact from the tube.

U.S. Pat. No. 4,342,264 shows another type of air spring using an elastomeric bumper mounted on one of the end members.

U.S. Pat. No. 4,218,599 discloses a polymer spring for use in a drawer of a cabinet to ensure that when the drawer is closed it does not rebound to a partially opened position.

U.S. Pat. No. 5,201,500 shows an air spring bumper consisting of one or more plastic members mounted in a stacked array on a mounting post within the pressure chamber.

However, the need exists for an improved type of air spring bumper which eliminates the heretofore used integral one-piece elastomeric bumper and replaces the same with a bumper construction which has a higher load carrying capacity with less deflection than prior one-piece elastomeric bumpers.

SUMMARY OF THE INVENTION

An objective of the invention includes providing an improved air spring construction for motor vehicles and other types of equipment having spaced movable end members and a two-piece bumper mounted within a pressurized chamber formed within an elastomeric sleeve which extends between the end members, for absorbing excessive shock imparted on the end members, and which has a greater load carrying capacity with lower deflection than the heretofore known bumper constructions.

A further objective of the invention is to provide such an improved air spring in which the shock absorbing bumper is comprised of a rigid base member preferably formed of metal and an elastomeric or rubber member mounted on top of the rigid base for contact with the opposite end member to absorb sudden large deflections and to act as a backup device in case of air spring failure or when the air spring is not inflated.

Still another objective of the invention is to provide such an improved air spring in which the elastomeric member is snap-fitted into position on top of the rigid base which is attached to one of the end members, and in which the air spring can absorb greater loads and forces than the heretofore used one-piece elastomeric bumpers.

Another objective of the invention is to provide such an improved air spring in which the metal base member is formed with a plurality of flexible fingers which are snap-fitted onto an existing mounting post to secure the rigid metal base on one of the end members for receiving the elastomeric member which is snap-fitted into the top of the metal base.

A still further objective of the invention is to provide such an improved air spring in which the metal base is welded to a clamp plate mounted on one of the end members and wherein said one end member usually is a piston.

These objectives and advantages are obtained by the improved air spring construction of the invention, the general nature of which may be stated as including a pair of spaced end members adapted to be mounted at spaced locations on a structure; a flexible sleeve formed of an elastomeric material sealingly engaged with the end members and forming a pressurized fluid chamber therebetween; and a shock absorbing bumper mounted on one of the end members, the bumper including a rigid metal base member having first and second ends, the first end being attached to the one end member and an elastomeric member mounted on the second end of the rigid base member for contacting the other of the end members for absorbing large deflections of the air spring.

BRIEF DESCRIPTION OF THE DRAWINGS

Preferred embodiments of the invention, illustrative of the best modes in which applicants have contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENTS

Figure 1:
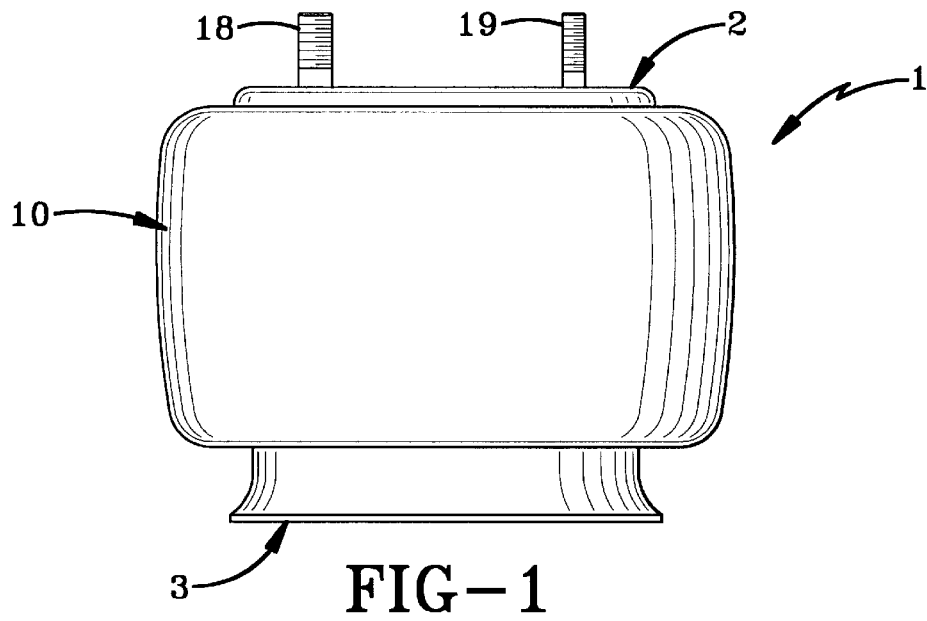
FIG. 1 is a side elevational view of an air spring having the improved two-piece metal/elastomeric bumper incorporated therein.
Figure 2:
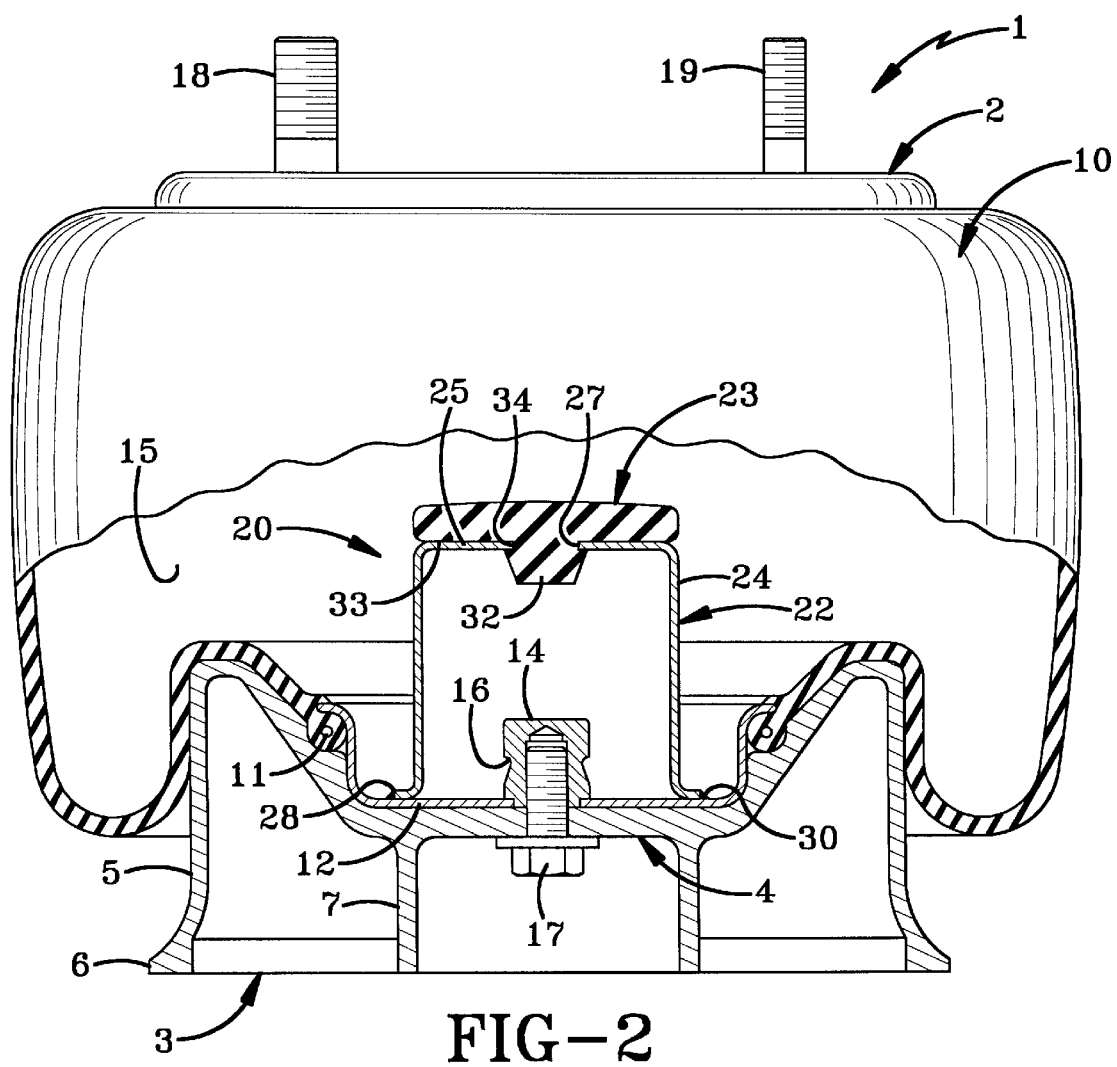
FIG. 2 is an enlarged elevational view of FIG. 1 with portions broken away and in section, showing the two-piece bumper.

The improved air spring of the invention is indicated generally at 1, and is shown in an unmounted, at-rest position in FIG. 1. Air spring 1 includes an upper end cap and an opposed axially spaced piston member, indicated generally at 2 and 3, respectively (FIG. 2). Piston 3 is of a usual construction, preferably having an inverted generally bowl-shaped configuration formed of a suitable material such as aluminum, steel, high strength plastic or the like. Piston 3 includes a base 4 and an annular wall 5 extending downwardly from the base, terminating in a peripheral edge 6. A central supporting structure 7 is joined with and extends downwardly from base 4.

One end of a flexible sleeve which is indicated generally at 10, terminates in a lower bead 11 which is clamped on base 4 of piston 3 by a clamping plate 12 in an air tight sealing relationship with piston 3. The other end of sleeve 10 has an end bead (not shown) which is secured in a curled marginal edge of mounting end cap 2 in an air tight sealing relationship therewith, providing a fluid tight chamber 15 within elastomeric sleeve 10. Other types of end sealing arrangements may be utilized without affecting the concept of the invention, such as shown in U.S. Pat. Nos. 4,852,861, 4,787,606 and 4,946,144.

A source of pressurized air or other fluid, communicates with chamber 15 through an air inlet in a mounting stud 18 extending outwardly from end plate 2. One or more additional mounting studs 19 are mounted on end cap 2 and extend upwardly therefrom for mounting air spring 1 on a vehicle, machine tool or other application in which it is to be used.

A usual bumper mounting stud or post 14 is brazed or welded on plate 12 and extends upwardly into pressure chamber 15. Post 14 preferably has a bulbous head formed with an undercut 16. A fastener 17 clamps piston 3 to plate 12.

Figure 3:
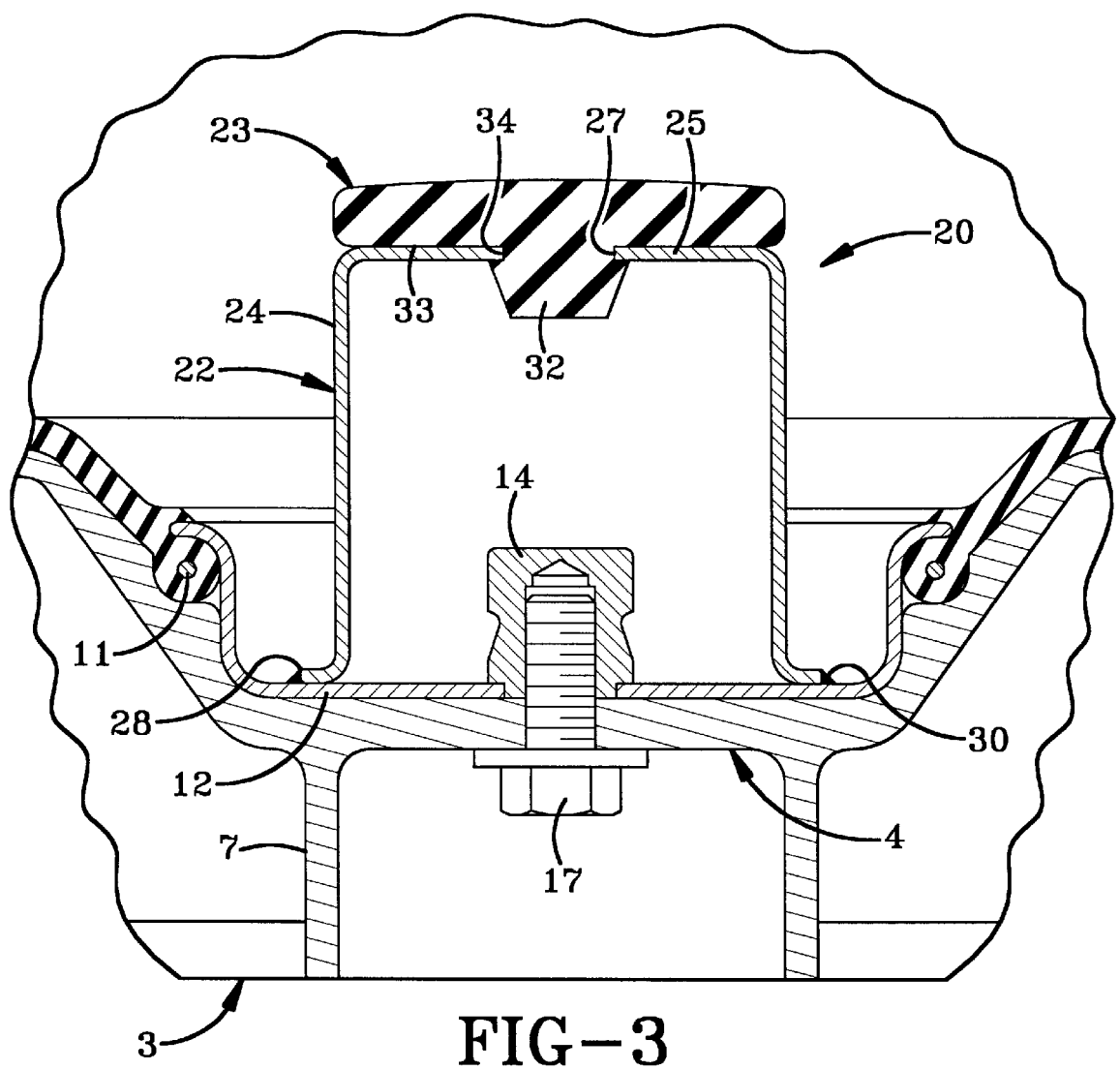
FIG. 3 is a further enlarged fragmentary sectional view of the bumper of FIG. 2.

The particular air spring construction described above and shown in the drawings and particularly in FIGS. 1, 2 and 3, is of a usual known construction and may vary without affecting the concept of the invention.

In accordance with the invention, an improved two-piece bumper indicated generally at 20 (FIG. 3), is mounted on base 4 of piston 3 and extends upwardly therefrom into chamber 15. Bumper 20 is adapted to engage end cap 2 in the event of a failure of the pressurized fluid within air chamber 15, or assists in absorbing excessive shock forces exerted on either of the end members. Bumper 20 includes a rigid base member indicated generally at 22, and a rubber or elastomeric member indicated generally at 23. A first embodiment of base 22 is shown particularly in FIGS. 2 and 3, and preferably is a substantially inverted cup-shaped one-piece member formed of a metal such as steel, having a cylindrical wall 24 and an integral end wall 25.

A centrally located hole 27 is formed in end wall 25 for mounting elastomeric member 23 thereon as described below. The opposite open end of cylindrical wall 24 has an outturned annular peripheral edge 28 which seats upon clamp plate 12 and is secured thereto by various fastening means such as welds 30, snap-fit, threads, or other attaching means.

Elastomeric member 23 is a generally disc-shaped member having a stem 32 extending from a bottom surface 33 thereof and is formed with an annular undercut 34 adjacent surface 33. The peripheral edge which defines hole 27 is received in undercut 34 to provide for a snap-fit engagement between member 23 and wall 25 for mounting elastomeric member 23 on base end wall 25 as shown particularly in FIGS. 2 and 3.

Figure 4:
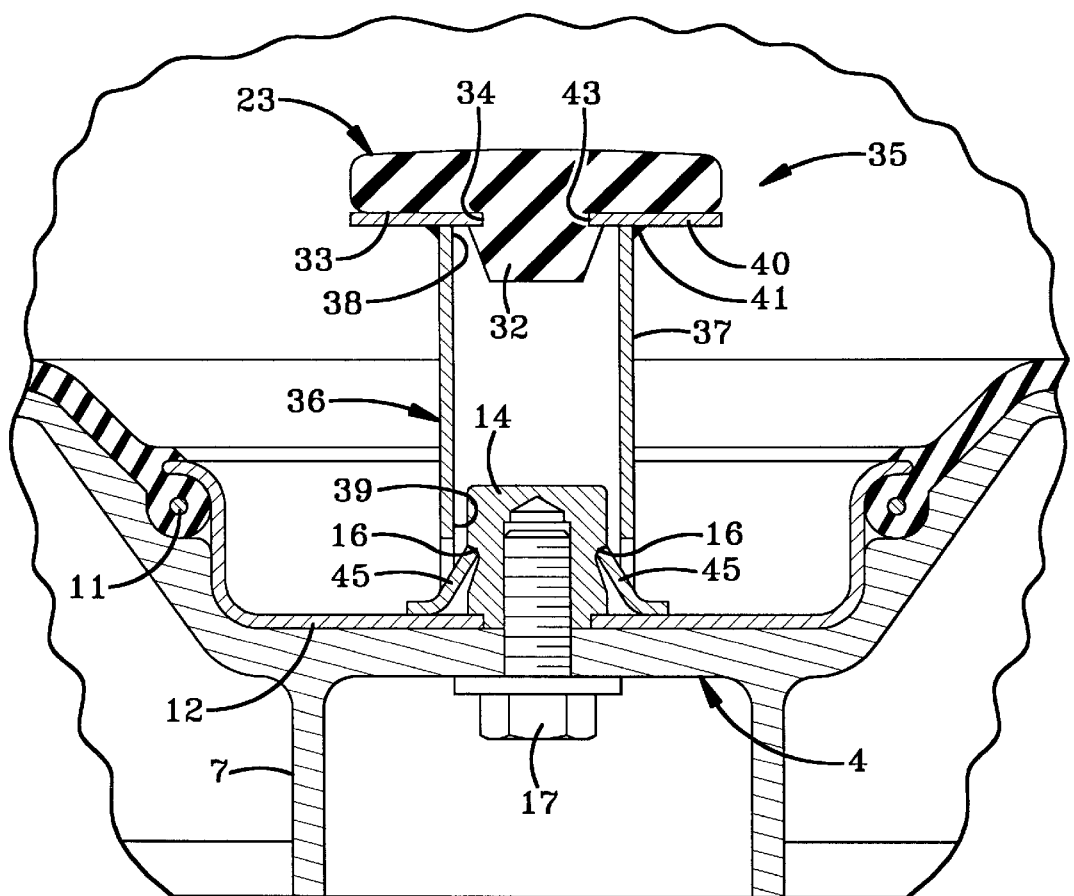
FIG. 4 is a fragmentary sectional view similar to FIG. 3 showing a modified two-piece bumper.
Figure 5:
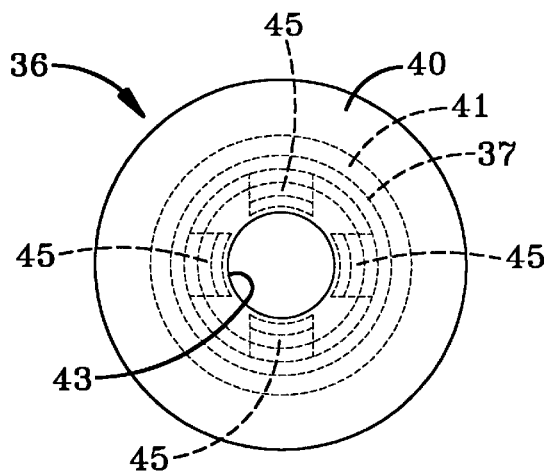
FIG. 5 is a top plan view of the metal component of bumper of FIG. 4.
Figure 6:
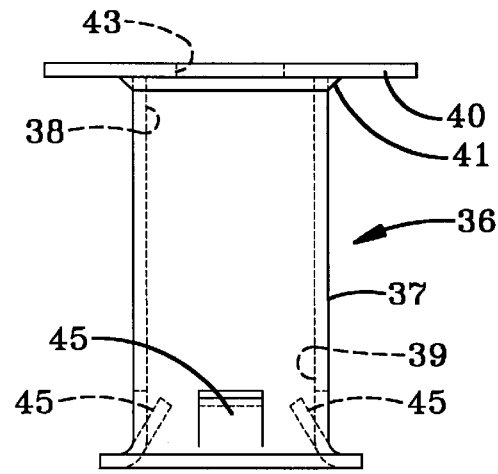
FIG. 6 is a side elevational view of the metal component of FIG. 5.

A second embodiment of the two-piece bumper is indicated generally at 35, and is shown particularly in FIGS. 4–6. Bumper 35 includes a rigid base 36 formed of a double open ended metal cylinder 37 providing an open top end 38 and an open bottom end 39. A separate disc-shaped end plate 40 extends across open end 38 of cylinder 37 and is secured thereto by various fastening means, such as welds 41. Plate 40 is formed with a central hole 43 into which stem 32 of elastomeric member 23 is snap-fitted as discussed above with respect to bumper 20.

In accordance with another feature of this embodiment, open bottom end 39 includes a plurality of flexible fingers 45 which are formed from cylinder 37 and project inwardly and upwardly as shown in FIGS. 4 and 6 and provide a snap-fit engagement with post 14, and in particular extend into an annular undercut 16 formed in post 14 to clamp base 36 onto clamp plate 12 and base 4 of piston 3.

In summary, the improved air spring of the present invention provides a two-piece construction consisting of a rigid metal base formed generally of an inverted cup-shaped metal member having a top end hole into which an elastomeric member is snap-fitted. The base is mounted by fasteners such as welds, or by a snap-fit engagement with a usual bumper mounting post on the piston member of the air spring. This two-piece bumper provides increased load carrying capacity and shock absorbing ability than that provided by the heretofore usual one-piece elastomeric bumper used in many prior art air springs and will have relatively low deflection due to the mounting of the elastomeric member on a rigid base and will provide adequate support for the opposite end member 2 in the event of a complete collapse of the air spring.

Accordingly, the improved two-piece elastomeric/metal bumper is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purpose and are intended to be broadly construed.

Moreover, the description and illustration of the invention is by way of example, and the scope of the invention is not limited to the exact details shown or described.

Having now described the features, discoveries and principles of the invention, the manner in which the improved air spring bumper is constructed and used, the characteristics of the construction, and the advantageous, new and useful results obtained, the new and useful structures, devices, elements, arrangements, parts and combinations, are set forth in the appended claims.

We claim:

1. An air spring including a pair of spaced end members adapted to be mounted at spaced locations on a structure, one of said end members being a piston having a base and an annular wall extending downwardly from the base; a flexible sleeve formed of an elastomeric material sealingly engaged with the end members and forming a pressurized fluid chamber therebetween; and a shock absorbing bumper mounted on the base of said piston, said bumper including a separate and distinct rigid metal base member having first and second ends, the first end being attached to the base of said piston and extending into the fluid chamber and an elastomeric member mounted on the second end of the rigid base member for contacting the other of said end members for absorbing large deflections of the air spring.

2. The air spring defined in claim 1 in which the second end of the base member includes an end wall formed with a hole; and in which the elastomeric member includes a stem which is snap-fitted into said hole to mount said elastomeric member on said base member.

3. The air spring defined in claim 2 in which the base member is a single one-piece hollow cylinder with the end wall being formed integral with a cylindrical sidewall, and with said first end being an open end of the cylindrical sidewall.

4. The air spring defined in claim 3 in which a clamp plate sealingly engages the sleeve of elastomeric material to the piston; and in which the cylindrical sidewall of the base member is welded to the clamp plate adjacent the said first end.

5. The air spring defined in claim 2 in which the base member is a hollow cylinder with a cylindrical sidewall; in which the first end is defined by a first peripheral edge of said sidewall; and in which the end wall is a separate disc-shaped member attached to a second peripheral edge of said cylindrical sidewall.

6. The air spring defined in claim 2 in which the elastomeric member has a disc-shaped body which is generally complementary in size to the end wall of the base member and is seated thereon.

7. The air spring defined in claim 2 in which the end wall is a disc-shaped member and is secured by a weld to the second end of the base member.

8. The air spring defined in claim 1 including a post mounted on the base of the piston and extending into a hollow interior of the rigid base member and having an enlarged end portion and an undercut; and in which the first end of the base member is formed with an opening defined by a plurality of circumferentially spaced flexible fingers, said fingers being inclined inwardly and upwardly toward the enlarged end portion of the post and are snap-fitted over the enlarged end portion and seated in the undercut thereof for mounting said base member on the base of the piston.

9. The air spring defined in claim 8 in which four equally spaced flexible fingers are formed in the metal sidewall of the base member.

10. The improved air spring defined in claim 1 in which the base member is an integral one-piece member.

11. An improved air spring having a pair of spaced end members adapted to be mounted at spaced locations on a structure and a flexible sleeve formed of an elastomeric material sealingly engaged with the end members and forming a pressurized fluid chamber therebetween, and a post mounted on one of the end members and extending into the fluid chamber, said post having an enlarged end portion and an undercut formed beneath said end portion; said improvement including a two-piece shock absorbing bumper mounted on the post for possible impact engagement with the other of said end members, said bumper including:

a rigid base member having first and second ends and an opening formed in the first end, said first end being seated upon one end member and with said post extending into said opening;

flexible finger means formed on the base member and engaged with the enlarged end portion of the post for mounting said two piece shock absorbing bumper on the said post and on said one end member; and an elastomeric member mounted on the second end of the rigid base for contacting the other of said end members for absorbing large deflections on the air spring.

12. The improved air spring defined in claim 11 in which the rigid base member has a generally cylindrical metal sidewall forming a hollow interior, with said sidewall defining the end opening; and in which the flexible fingers are spaced generally circumferentially about the end opening and are formed integrally from said sidewall and extend inwardly into the hollow interior adjacent said end opening.

13. The improved air spring defined in claim 12 in which a plurality of equally spaced flexible fingers are formed in the metal sidewall of the base member.

14. The improved air spring defined in claim 11 in which the elastomeric member has a disc-shaped body which is generally complementary in size to the second end of the base member and is seated thereon.

15. The improved air spring defined in claim 14 in which the second end has a disc-shaped member secured thereto an attaching means.

16. The improved air spring defined in claim 11 in which the second end of the base member has an end wall; in which a hole is formed in said end wall; in which the elastomeric member includes a stem; and in which said stem is snap-fitted into the hole to mount said elastomeric member on the second end of the base member.

17. An air spring including a pair of spaced end members adapted to be mounted at spaced locations on a structure; a flexible sleeve formed of an elastomeric material sealingly engaged with the end members and forming a pressurized fluid chamber therebetween; a shock absorbing bumper mounted on one of said end members, said bumper including a rigid metal base member having first and second ends, the first end being attached to said one end member and an elastomeric member mounted on the second end of the rigid base member for contacting the other of said end members for absorbing large deflections of the air spring; and a post mounted on the said one end member and extending into a hollow interior of the rigid base member and having an enlarged end portion and an undercut, said first end of the base member being formed with an opening by a plurality of circumferentially spaced flexible fingers, said fingers being inclined inwardly and upwardly toward the enlarged end portion of the post and are snap-fitted over the enlarged end portion and seated in the undercut thereof for mounting said base member on the said one end member.

18. The air spring defined in claim 17 in which four equally spaced flexible fingers are formed in a metal sidewall of the base member.

* * * * *